(12) United States Patent
Mui et al.

(10) Patent No.: US 10,090,515 B2
(45) Date of Patent: Oct. 2, 2018

(54) BIPOLAR HYBRID ENERGY STORAGE DEVICE

(71) Applicant: Gridtential Energy, Inc., Santa Clara, CA (US)

(72) Inventors: Collin Kwok Leung Mui, Mountain View, CA (US); Daniel Jason Moomaw, Santa Clara, CA (US); Peter Gustave Borden, San Mateo, CA (US)

(73) Assignee: Gridtential Energy, Inc., Santa Clara, CA (US)

(*) Notice: Subject to any disclaimer, the term of this patent is extended or adjusted under 35 U.S.C. 154(b) by 0 days.

(21) Appl. No.: 15/197,346

(22) Filed: Jun. 29, 2016

(65) Prior Publication Data

US 2016/0308195 A1    Oct. 20, 2016

Related U.S. Application Data

(63) Continuation-in-part of application No. PCT/US2014/072824, filed on Dec. 30, 2014, and a
(Continued)

(51) Int. Cl.
*H01M 4/66* (2006.01)
*H01M 4/133* (2010.01)
(Continued)

(52) U.S. Cl.
CPC ............. *H01M 4/14* (2013.01); *H01G 11/04* (2013.01); *H01G 11/36* (2013.01); *H01G 11/52* (2013.01);
(Continued)

(58) Field of Classification Search
CPC ........ H01M 4/366; H01M 10/12; H01M 4/14; H01M 4/82; H01M 4/0426; H01M 4/22; H01M 2/14; H01M 4/0404; H01M 10/14; H01M 4/667; H01M 4/0457; H01M 4/68; H01M 10/18; H01M 4/045;
(Continued)

(56) References Cited

U.S. PATENT DOCUMENTS 3,982,960 A    9/1976    Hoekje et al.
4,164,068 A    8/1979    Shropshire et al.
(Continued)

FOREIGN PATENT DOCUMENTS

CN    101558512 A    10/2009
CN    103493250 A    1/2014
(Continued)

OTHER PUBLICATIONS

"U.S. Appl. No. 13/994,434 Battery and Assembly Method mailed Mar. 20, 2014", 1.
(Continued)

*Primary Examiner* — Cynthia K Walls
(74) *Attorney, Agent, or Firm* — Schwegman Lundberg & Woessner, P.A.

(57) ABSTRACT

Apparatus and techniques are described herein for providing a plate such as can be included as a portion of a hybrid energy storage device assembly. A hybrid device can include capacitor and battery structures, such as can include a sealed stack of hybrid bipolar plates comprising silicon wafers.

23 Claims, 6 Drawing Sheets

Related U.S. Application Data continuation-in-part of application No. 14/477,312, filed on Sep. 4, 2014, now Pat. No. 9,570,737, which is a continuation of application No. 13/994,434, filed as application No. PCT/US2012/037598 on May 11, 2012, now Pat. No. 8,828,582.

(60) Provisional application No. 61/921,919, filed on Dec. 30, 2013, provisional application No. 61/921,871, filed on Dec. 30, 2013, provisional application No. 62/044,601, filed on Sep. 2, 2014, provisional application No. 62/087,024, filed on Dec. 3, 2014, provisional application No. 61/484,854, filed on May 11, 2011, provisional application No. 61/525,068, filed on Aug. 18, 2011.

(51) Int. Cl.

| | | |
|---|---|---|
| *H01M 4/14* | (2006.01) | |
| *H01M 4/56* | (2006.01) | |
| *H01M 4/68* | (2006.01) | |
| *H01M 12/00* | (2006.01) | |
| *H01G 11/04* | (2013.01) | |
| *H01G 11/72* | (2013.01) | |
| *H01G 11/36* | (2013.01) | |
| *H01G 11/86* | (2013.01) | |
| *H01G 11/52* | (2013.01) | |
| *H01G 11/80* | (2013.01) | |
| *H01M 2/02* | (2006.01) | |
| *H01M 2/08* | (2006.01) | |
| *H01M 2/16* | (2006.01) | |
| *H01M 4/02* | (2006.01) | |

(52) U.S. Cl.
CPC ............ *H01G 11/72* (2013.01); *H01G 11/80* (2013.01); *H01G 11/86* (2013.01); *H01M 2/0277* (2013.01); *H01M 2/08* (2013.01); *H01M 2/1613* (2013.01); *H01M 4/56* (2013.01); *H01M 4/66* (2013.01); *H01M 4/667* (2013.01); *H01M 4/68* (2013.01); *H01M 12/005* (2013.01); *H01M 2004/029* (2013.01); *Y10T 29/4911* (2015.01)

(58) Field of Classification Search
CPC .. H01M 10/0418; H01M 4/0492; H01M 4/56; H01M 4/38; H01M 2004/021; H01M 2004/029; Y10T 29/4911; Y02T 10/7016; Y02E 60/126

See application file for complete search history.

(56) References Cited

U.S. PATENT DOCUMENTS

| | | | |
|---|---|---|---|
| 4,275,130 | A | 6/1981 | Rippel et al. |
| 4,324,848 | A | 4/1982 | Will |
| 4,828,939 | A | 5/1989 | Turley et al. |
| 5,156,932 | A | 10/1992 | Dougherty et al. |
| 5,279,909 | A | 1/1994 | Horner et al. |
| 5,298,683 | A | 3/1994 | Taylor |
| 5,302,472 | A | 4/1994 | Ando et al. |
| 5,470,679 | A | 11/1995 | Lund et al. |
| 5,595,839 | A | 1/1997 | Hossain |
| 5,916,709 | A | 6/1999 | Arias et al. |
| 5,948,562 | A | 9/1999 | Fulcher et al. |
| 6,210,826 | B1 | 4/2001 | Dopp et al. |
| 7,473,488 | B2 | 1/2009 | Knight et al. |
| 8,828,582 | B2 | 9/2014 | Borden |
| 9,570,737 | B2 | 2/2017 | Borden |
| 2007/0111090 | A1 | 5/2007 | Cardenas-valencia et al. |
| 2007/0139001 | A1 | 6/2007 | Hahn |
| 2007/0269718 | A1 | 11/2007 | Krause et al. |
| 2008/0292953 | A1 | 11/2008 | Hosaka et al. |
| 2009/0053601 | A1 | 2/2009 | Kelley |
| 2009/0061319 | A1 | 3/2009 | Kim et al. |
| 2010/0015517 | A1 | 1/2010 | Fujita et al. |
| 2010/0062335 | A1 | 3/2010 | Datta |
| 2010/0223467 | A1 | 9/2010 | Dismore et al. |
| 2010/0255371 | A1* | 10/2010 | Takayama ........... H01M 2/1673 429/210 |
| 2010/0310923 | A1 | 12/2010 | Ogg et al. |
| 2010/0330411 | A1 | 12/2010 | Nam et al. |
| 2011/0014520 | A1 | 1/2011 | Ueda |
| 2011/0141618 | A1 | 6/2011 | Wallash et al. |
| 2011/0223467 | A1 | 9/2011 | Shacklette et al. |
| 2013/0026409 | A1* | 1/2013 | Baker ..................... H01M 2/14 252/62.2 |
| 2013/0065105 | A1 | 3/2013 | Faust |
| 2013/0130096 | A1 | 5/2013 | Lev et al. |
| 2014/0079985 | A1 | 3/2014 | Borden |
| 2014/0370369 | A1 | 12/2014 | Borden |
| 2016/0329535 | A1 | 11/2016 | Moomaw et al. |
| 2017/0200980 | A1 | 7/2017 | Borden |

FOREIGN PATENT DOCUMENTS

| | | |
|---|---|---|
| CN | 106133992 A | 11/2016 |
| GB | 1394694 A | 5/1975 |
| GB | 1394694 A | 5/1975 |
| IN | 201617025763 A | 8/2016 |
| JP | 4828865 A | 9/1973 |
| JP | 60-101867 A | 6/1985 |
| JP | 60101867 A | 6/1985 |
| JP | 60101867 A | 6/1985 |
| JP | 61283173 A | 12/1986 |
| JP | 62229772 A | 10/1987 |
| JP | 05135761 A | 6/1993 |
| JP | 5135761 A | 6/1993 |
| JP | 5135761 A | 6/1993 |
| JP | H05135761 A | 6/1993 |
| JP | 07142054 A | 6/1995 |
| JP | 08241707 A | 9/1996 |
| JP | 2005259379 A | 9/2005 |
| JP | 2006040722 A | 2/2006 |
| JP | 2007335198 A | 12/2007 |
| JP | 2007335206 A | 12/2007 |
| JP | 2013004864 A | 1/2013 |
| JP | 2014507774 A | 3/2014 |
| JP | 5634623 B2 | 10/2014 |
| JP | 2015028954 A | 2/2015 |
| JP | 2017508241 A | 3/2017 |
| KR | 1020090093191 A | 9/2009 |
| KR | 1020130114736 A | 10/2013 |
| KR | 1020160017108 A | 10/2013 |
| KR | 101590529 B1 | 2/2016 |
| KR | 1020160121517 A | 10/2016 |
| WO | WO-2008059529 A1 | 5/2008 |
| WO | WO-2008059529 A1 | 5/2008 |
| WO | WO-2008114738 A1 | 9/2008 |
| WO | WO-2011109477 A2 | 9/2011 |
| WO | WO-2012155082 A1 | 11/2012 |
| WO | WO-2012155082 A1 | 11/2012 |
| WO | WO-2015103295 A1 | 7/2015 |
| WO | WO-2015103304 A1 | 7/2015 |

OTHER PUBLICATIONS

"U.S. Appl. No. 13/994,434, Examiner Interview Summary dated Apr. 2, 2014", 3 pgs.
"U.S. Appl. No. 13/994,434, Final Office Action dated Apr. 15, 2014", 9 pgs.
"U.S. Appl. No. 13/994,434, Non Final Office Action dated Dec. 31, 2013", 12 pgs.
"U.S. Appl. No. 13/994,434, Notice of Allowance dated Jun. 24, 2014", 7 pgs.
"U.S. Appl. No. 13/994,434, Preliminary Amendment filed Jun. 14, 2013", 7 pgs.
"U.S. Appl. No. 13/994,434, Response filed Mar. 27, 2014 to Non Final Office Action dated Dec. 31, 2013", 12 pgs.

(56) References Cited

OTHER PUBLICATIONS

"U.S. Appl. No. 13/994,434, Response filed May 16, 2014 to Final Office Action dated Apr. 15, 2014", 10 pgs.
"U.S. Appl. No. 14/477,312, Preliminary Amendment filed Sep. 22, 2014", 7 pgs.
"U.S. Appl. No. 14/667,240, Notice of Allowance dated Apr. 21, 2016", 9 pgs.
"U.S. Appl. No. 15/109,402, Preliminary Amendment filed Jun. 30, 2016", 9 pgs.
"Canada Application Serial No. 2,825,921, Office Action dated Oct. 20, 2015", 3 pgs.
"Canada Application Serial No. 2,825,921, Response filed Nov. 9, 2015 to Office Action dated Oct. 20, 2015", 15 pgs.
"Canadian Application Serial No. 2,825,921, Office Action dated Jan. 20, 2015", 8 pgs.
"Canadian Application Serial No. 2,825,921, Response filed Jul. 7, 2015 to Office Action dated Jan. 20, 2015", 19 pgs.
"Chinese Application Serial No. 201280009851.1, Office Action dated Apr. 22, 2015", w/ English Translation, 12 pgs.
"Chinese Application Serial No. 201280009851.1, Office Action dated Aug. 31, 2015", w/ English Translation, 2 pgs.
"Chinese Application Serial No. 201280009851.1, Response filed Jan. 15, 2016 to Office Action dated Aug. 31, 2015", with English translation of claims, 10 pgs.
"Chinese Application Serial No. 201280009851.1, Response filed Jul. 15, 2015 to Office Action dated Apr. 22, 2015", w/ English Claims, 41 pgs.
"Chinese Application Serial No. 201280009851.1, Voluntary Amendment filed May 9, 2014", w/English specification and claims, 29 pgs.
"European Application Serial No. 12722634.8, Examination Notification Art. 94(3) dated Dec. 11, 2014", 5 pgs.
"European Application Serial No. 12722634.8, Office Action dated Mar. 27, 2014", 6 pgs.
"European Application Serial No. 12722634.8, Response filed Aug. 1, 2014 to Office Action dated Mar. 27, 2014", 13 pgs.
"European Application Serial No. 12722634.8, Response filed Apr. 13, 2015 to Examination Notification Art. 94(3) dated Dec. 11, 2014", 15 pgs.
"European Application Serial No. 15198173.5, Extended European Search Report dated Mar. 30, 2016", 9 pgs.
"International Application Serial No. PCT/US2012/037598, International Preliminary Report on Patentability dated Jul. 23, 2013", 12 pgs.
"International Application Serial No. PCT/US2012/037598, International Search Report dated Jul. 23, 2012", 3 pgs.
"International Application Serial No. PCT/US2012/037598, Written Opinion dated Jul. 23, 2012", 17 pgs.
"International Application Serial No. PCT/US2012/037598, Written Opinion dated Jul. 23, 2012", 8 pgs.
"International Application Serial No. PCT/US2012/037598, Written Opinion of the International Preliminary Examining Authority, dated Apr. 23, 2013", 6 pgs.
"International Application Serial No. PCT/US2014/072804, International Preliminary Report on Patentability dated Jul. 14, 2016", 11 pgs.
"International Application Serial No. PCT/US2014/072804, International Search Report dated Apr. 23, 2015", 3 pgs.
"International Application Serial No. PCT/U52014/072804, Written Opinion dated Apr. 23, 2015", 9 pgs.
"International Application Serial No. PCT/US2014/072624, International Preliminary Report on Patentability dated Jul. 14, 2016", 9 pgs.
"International Application Serial No. PCT/US2014/072824, International Search Report dated Mar. 24, 2015", 2 pgs.
"International Application Serial No. PCT/US2014/072824, Written Opinion dated Mar. 24, 2015", 7 pgs.
"Japanese Application Serial No. 2013-552743, Office Action dated Jan. 21, 2014", w/ English Translation, 4 pgs.
"Japanese Application Serial No. 2013-552743, Office Action dated May 20, 2014", w/English translation, 4 pgs.
"Japanese Application Serial No. 2013-552743, Response filed Apr. 21, 2014 to Office Action dated Jan. 21, 2014", w/English claims, 13 pgs.
"Japanese Application Serial No. 2013-552743, Response filed Aug. 18, 2014 to Office Action dated May 20, 2014", w/English claims, 9 pgs.
"Japanese Application Serial No. 2014-209992, Office Action dated Apr. 26, 2016", 3 pgs.
"Japanese Application Serial No. 2014-209992, Office Action dated Dec. 15, 2015", with English translation, 8 pgs.
"Japanese Application Serial No. 2014-209992, Response filed Mar. 28, 2016 to Office Action dated Dec. 15, 2015", with English translation of claims, 6 pgs.
"Korean Application Serial No. 10-2013-7021903, Office Action dated Feb. 9, 2015", w/ English Claims, 15 pgs.
"Korean Application Serial No. 10-2013-7021903, Response filed Aug. 7, 2015 to Office Action dated Feb. 9, 2015", w/ English Claims, 27 pgs.
"Korean Application Serial No. 10-2016-7002096, Office Action dated Apr. 14, 2016", 10 pgs.
"Korean Application Serial No. 10-2016-7002096, Response filed Jun. 14, 2016 to Office Action dated Apr. 14, 2016", (English Translation of Claims), 16 pgs.
"Machine translation of JP 2007-335206", [Online] Retrieved From Internet: <http://www19.ipdl.inpit.go.jp/PA1/cgi-bin/PA1 INDEX>, (Apr. 8, 2014), 28 pgs.
"U.S. Appl. No. 14/477,312, Notice of Allowance dated Oct. 28, 2016", 9 pgs.
"U.S. Appl. No. 14/477,312, Preliminary Amendment filed Oct. 18, 2016", 3 pgs.
"U.S. Appl. No. 15/413,692, Preliminary Amendment filed Jan. 27, 2017", 6 pgs.
"Canadian Application Serial No. 2,935,552, Voluntary Amendment filed Dec. 9, 2016", 7 pgs.
"Chinese Application Serial No. 201480076523.2, Voluntary Amendment filed Mar. 23, 2017", 15 pgs.
"European Application Serial No. 14877474.8, Extended European Search Report dated Aug. 14, 2017", 10 pgs.
"European Application Serial No. 14877474.8, Response filed Feb. 9, 2017 to Communication Pursuant to Rules 161(2) and 162 EPC mailed Aug. 26, 2016", 9 pgs.
"Indian Application Serial No. 201617025763, Voluntary Amendment filed Aug. 19, 2016", 14 pgs.
"Canadian Application Serial No. 2,935,552, Office Action dated Dec. 18, 2017", 4 pgs.
"Japanese Application Serial No. 2016-543674, Office Action dated Feb. 27, 2018", w/ English Translation, 8 pgs.
"Korean Application Serial No. 10-2016-7021022, Notice of Preliminary Rejection dated Oct. 23, 2017", W/English Translation, 12 pgs.
Zuo, Wenhua, et al., "Battery-Supercapacitor Hybrid Devices: Recent Progress and Future Projects", Adv. Sci. 4, 1600539, [Online]. Retrieved from the Internet: <URL: https://www.ncbi.nlm.nih.gov/pmc/articles/PMC5514976/pdf/ADVS-4-na.pdf>, (2017), 1-21.
"Australian Application Serial No. 2014373800, First Examination Report dated Apr. 10, 2018", 3 pgs.
"European Application Serial No. 14877474.8, Response filed Mar. 2, 2018 to Extended European Search Report dated Aug. 14, 2017", 47 pgs.
"Korean Application Serial No. 10-2016-7021022, Response filed Apr. 23, 2018 to Notice of Preliminary Rejection dated Oct. 23, 2017", w/ English Claims, 24 pgs.
"Chinese Application Serial No. 201480076523.2, Office Action dated May 25, 2018", W English Translation, 8 pgs.
"U.S. Appl. No. 15/413,692, Non Final Office Action dated Aug. 14, 2018", 10 pgs.

* cited by examiner

BIPOLAR HYBRID ENERGY STORAGE DEVICE

CLAIM OF PRIORITY

This application is a Continuation-in-Part and claims benefit of Moomaw et al., International Patent Application Serial Number PCT/US2014/072824, titled "BIPOLAR HYBRID ENERGY STORAGE DEVICE," filed Dec. 30, 2014 which claims the benefit of priority of (1) Moomaw et al., U.S. Provisional Application Ser. No. 61/921,919, titled "SEALED BIPOLAR BATTERY ASSEMBLY," filed on Dec. 30, 2013; and claims the benefit of priority of (2) Mui et al., U.S. Provisional Application Ser. No. 61/921,871, titled "HYBRID BIPOLAR LEAD ACID BATTERY." filed on Dec. 30, 2013; and claims the benefit of priority of (3) Moomaw et al., U.S. Provisional Application Ser. No. 62/044,601, titled "MECHANICALLY SEALED BIPOLAR BATTERY ASSEMBLY," filed on Sep. 2, 2014; and claims the benefit of priority of (4) Mui et al., U.S. Provisional Application Ser. No. 62/087,024, titled "BIPOLAR HYBRID ENERGY STORAGE DEVICE." filed on Dec. 3, 2014; and this application is a Continuation-in-Part and claims the benefit of Borden. U.S. patent application Ser. No. 14/477,312, titled "WAFER-BASED BIPOLAR BATTERY PLATE, filed Sep. 4, 2014, which is a continuation of and claims priority to Borden, U.S. patent application Ser. No. 13/994,434, titled "BATTERY AND ASSEMBLY METHOD," filed 14 Jun. 2013, which application is a U.S. National Stage Filing under 35 U.S.C. § 371 of International Patent Application Serial No. PCT/US2012/037598, titled "AN IMPROVED BATTERY AND ASSEMBLY METHOD," filed on May 11, 2012, and published on Nov. 15, 2012, as WO 2012/155082, which claims the benefit of priority, under 35 U.S.C. Section 119(e), to Borden, U.S. Provisional Application Ser. No. 61/484,854, titled "BATTERY AND ASSEMBLY METHOD," filed on May 11, 2011 and Borden, U.S. Provisional Application Ser. No. 61/525,068, titled "BATTERY AND ASSEMBLY METHOD," filed on Aug. 18, 2011, the benefit of each of which is hereby presently claimed, and the entirety of each of which is hereby incorporated by reference herein.

BACKGROUND

Energy storage is ubiquitous in our daily lives. For example, various batteries can be found in mobile electronic devices, automobiles, or utility-scale backup systems. Also, energy storage is becoming more important as our energy composition transforms into a renewable-focused structure, at least in part because of the intermittent nature of renewable energy sources.

Electrochemical cells are energy storage devices in which energy from reduction-oxidation (redox) chemical reactions are converted to electrical energy. An electrochemical cell generally includes a cathode, an anode, and the electrolyte. Reduction and oxidation reactions occur at the cathode and anode, respectively, while charged ions are transported through the electrolyte to generate an electrical current. In a "primary cell" (e.g., a non-rechargeable battery), the electrochemical reactions are irreversible. As the stored electrochemical energy is exhausted, the battery can no longer be used. Redox reactions in a "secondary cell" are reversible, and such batteries can be referred to generally as "rechargeable."

The lead acid battery, invented by Gaston Planté in 1859, is generally the oldest rechargeable battery technology. Active electrochemical materials in the lead acid battery include lead dioxide ($PbO_2$) and lead (Pb), which are generally pasted onto lead gird current collectors to form the positive and negative electrodes, respectively, in generally-available lead acid batteries. The electrodes are arranged electrically in parallel and are immersed into sulfuric acid ($H_2SO_4$) electrolyte to form a battery assembly. Such generally-available lead acid batteries are robust, economical, and relatively safe to operate. Therefore, lead acid batteries have found a wide range of consumer and industrial applications, and remain a commonly-used battery chemistry.

Overview

Despite the simplicity and low cost of generally-available lead acid batteries, such batteries can suffer from several limitations related to chemistry and configuration. First, lead acid batteries generally have low energy densities, at least in part because the weight of the battery is dominated by the heavy current collectors made from lead, which in turn generally corresponds to heavy mechanical construction. External circuitry for the parallel cell configuration can also add to the size and weight of the overall battery assembly. Second, the cycle life of generally-available lead acid batteries can be influenced by side reactions intrinsic to lead acid battery electrochemistry. For example, anodic corrosion of a lead grid current collector or irreversible formation of lead sulfate in the active mass—known as sulfation—can both participate as side reactions, such as shortening a cycle life of generally-available lead acid batteries.

The present inventors have recognized, among other things, that lead acid battery chemistry, despite generally lower energy density than the other examples mentioned above, can be used to provide a hybrid energy storage device. For example, the electrolyte in a lead acid battery generally can include sulfuric acid, which is highly dissociated and therefore can provide the charge concentration for efficient storage at a capacitor electrode. A relatively high operating voltage of a lead acid battery can also enhance a charge storage capability of the capacitor electrode. In an example, a lead acid hybrid device can include a lead dioxide cathode and an electrochemical double layer capacitor anode. The anode can include a high-surface-area porous material, such as can include carbon.

In an example, a hybrid device can include current collectors comprising silicon (e.g., silicon wafer current collectors), along with cathodes comprising lead dioxide active material paste, anodes comprising a porous carbon electrode (e.g., as in a supercapacitor configuration), separators to prevent cathode-anode shorting, and an electrolyte (e.g., sulfuric acid). A hybrid bipolar plate can be constructed such as by sandwiching the current collector between the cathode and the anode. The bipolar hybrid device can be assembled by stacking bipolar plates and separators alternately such that the bipolar plate provides the cathode portion of one cell and the anode portion of the next cell. The current collectors can be electronically conductive but ionically impermeable, such that each cell in the stack includes an electrolyte region sealed from adjacent electrolyte regions.

In an illustrative example, to assemble the bipolar hybrid energy storage device, current collectors can be encased and protected by mechanical casings that can be configured to one or more of define the cell separation or hermetically seal the cells. The cathode active material separator, and the capacitor electrode can be stacked on the current collector inside the casing. The next casing with current collector, cathode, separator, and capacitor electrode can be stacked and adhered, for example, onto the previous casing. The stacking process can be repeated to provide a multi-cell bipolar hybrid device (or such a device can be otherwise provided, having a stacked configuration). The stack can be terminated with end caps, filled with electrolyte, and formed to become an operating energy storage device.

This overview is intended to provide an overview of subject matter of the present patent application. It is not intended to provide an exclusive or exhaustive explanation of the invention. The detailed description is included to provide further information about the present patent application.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
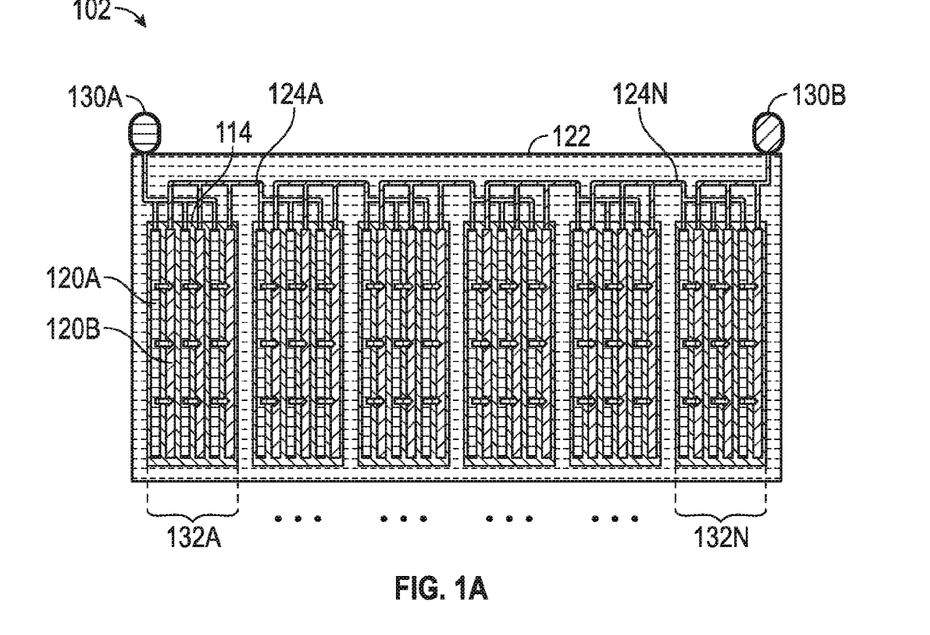
FIGS. 1A and 1B illustrate generally examples of a monopolar battery architecture and a bipolar battery architecture.
Figure 1B:
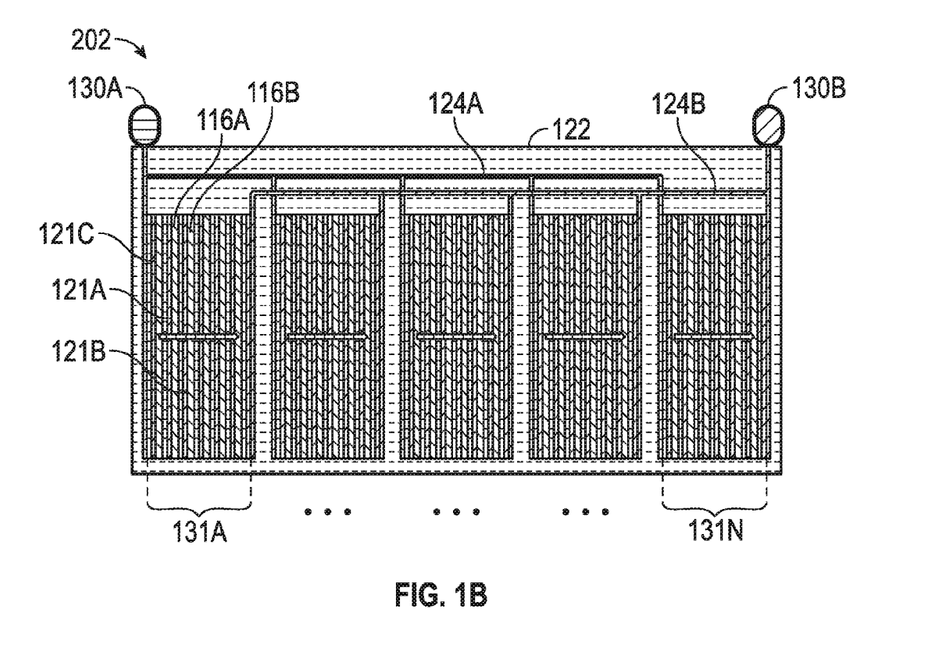

FIGS. 1A and 1B illustrate generally examples of a monopolar battery architecture 102 and a bipolar battery architecture 202. In a monopolar configuration, a current collector generally includes an active material of a single polarity (e.g., positive or negative) applied to both (e.g. opposite) sides of the current collector, such as including application of the active material in paste form. A positive-negative pair can be formed such as including the first plate 120A having a first polarity active material and a second plate 120B having an opposite second polarity active material, to form an electrochemical cell in the electrolyte 114, such as shown illustratively in FIG. 1A. In a lead-acid example, such a single cell voltage can be around 2.1V. A number of cells can be arranged electrically in parallel configuration as a stack 132A. Individual stacks 132A through 132N can be connected in series to assemble a battery pack 102.

In FIG. 1A, a first terminal 130A can provide a first polarity, and a second terminal 130B can provide an opposite second polarity. The first and second terminals can be coupled to the first stack 132A and last stack 132N, respectively, and the stacks can be coupled together serially using a first bus 124A through an "Nth" bus 124N. By contrast with FIG. 1A, a battery architecture 202, as shown illustratively in FIG. 1B using a bipolar plate configuration, can offer design simplicity. Respective positive and negative active materials can be applied, such as through pasting, onto opposite sides of the current collector to form a bipolar plate.

FIG. 1B illustrates generally an example that can include a battery pack 202 having one or more bipolar battery plates, such as bipolar plates 121A, 121B, and 121C. As in FIG. 1A, a first terminal 130A can provide a first polarity, and a second terminal 130B can provide an opposite second polarity. Such bipolar plates can be sandwiched with electrolyte in regions 116A and 116B, for example, to form sealed cells. In an example, an electrolyte in region 116A can be one or more of fluidically isolated or hermetically sealed so that electrolyte cannot bypass the bipolar plate 121A to an adjacent region such as the electrolyte region 116B, or to suppress or inhibit leakage of electrolyte from the pack 202. As shown illustratively in FIG. 1B, cells can be disposed in a series configuration. The cells can be aligned to form a stack 131A.

In a bipolar architecture, a current collector (e.g., a silicon wafer 104 such as included as a portion of the bipolar plate 121A) can be shared between the negative electrode of one cell and a positive electrode of the next. A first bus 124A can connect to a first electrode in each stack 131A through 131N, and a second bus 124B can connect to an opposite electrode in each stack 131A through 131N. By contrast with FIG. 1A, the stacks 131A through 131N can each provide serial connections through the bulk of the conductive silicon wafers as shown by the arrows. In this manner, a total number of interconnect buses external to the stack 131A through 131N can be reduced as compared to an architecture using monopolar plates.

Other configurations of interconnecting one or more stacks 131A through 131N can be used. For example, bipolar stacks 131A through 131N can be connected in parallel for lower voltage applications, such as to assemble a lower voltage battery pack. Alternatively, a single bipolar stack with many cells can form a higher-voltage pack.

The monopolar or bipolar architectures of FIG. 1A or 1B can be modified to include a combination of battery-type electrodes (e.g., configured as one or more cathodes in a hybrid energy storage device) and capacitor-type electrode (e.g., configured as one more anodes in a hybrid energy storage device). A hybrid device can be considered a hybrid between a battery and a capacitor. An electrochemical cell, or battery, generally includes a cathode and an anode. Such a cell generally stores energy through Faradaic electrochemical reactions at the cathode and the anode. As mentioned above, a voltage developed by the battery is governed by the electrochemical reactions, and therefore is relatively constant. By contrast, an electrochemical double-layer capacitor generally stores charge by charge separation at the double-layer on a surface of a capacitor electrode. The amount of charged stored by the capacitor is generally proportional to the applied voltage. In a hybrid device, the positive terminal can be configured as a battery cathode, and the negative terminal can be configured as a capacitor anode. As the battery and capacitor electrodes have different charge storage mechanisms, the contributions of each electrode, as well as the electrolyte, can be taken into account to determine a total energy stored in the device.

For example, a first monopolar plate 120A in the example of FIG. 1A can include a battery-type plate comprising an anode, and a second monopolar plate 120B can include a capacitor-type electrode comprising a cathode. The anode and cathode can form a hybrid cell. In the example of FIG. 1A, the hybrid cells are generally arranged in parallel within the electrolyte environment. In a bipolar configuration, such as shown illustratively in FIG. 1B, the hybrid cells can be arranged at least in part in series, and can be individually sealed so that electrolyte regions between cells are isolated from each other. The arrows illustrate generally a direction of current flow during discharge. A maximum charge stored at a hybrid battery electrode is can be represented by, $$Q_B = m_B c_B, \qquad [\text{EQN. 1}]$$

where mB can represent the mass of the cathode material and cB can represent a specific capacity of the electrode. A charge accumulated at the surface of the capacitor electrode is generally proportional to the charge voltage range and can be expressed as, $$Q_C = m_C c_C V_C, \qquad [\text{EQN. 2}]$$

where mC and cC can represent a mass and a specific capacitance of the capacitor material, and VC can represent a voltage range during charge. Assuming that the total capacity is limited by the battery electrode, then the energy stored in the hybrid device can be represented as.

$$E = (V_M - V_C/2) m_B c_B, \qquad [\text{EQN. 3}]$$

where VM can represent the operating voltage of the battery. The electrolyte can participate in the charge storage mechanism as charged ions are separated at the capacitor electrode surface. A minimum amount of electrolyte generally included in the hybrid device can be represented by, $$m_i = (\rho c_B / c_o F) m_B, \qquad [\text{EQN. 4}]$$

where ρ can represent a density of the electrolyte, co can represent a concentration of the electrolyte, and F can represent Faraday's constant. In an example, a proposed hybrid device includes a bipolar architecture, in which the hybrid cells are arranged electrically in series. Conceptually, the construction of a bipolar hybrid battery generally involves stacking bipolar plates and separators alternately. The bipolar plate can be assembled by sandwiching a current collector (e.g., including a rigid semiconductor substrate) between the battery cathode and the capacitor anode. The current collectors can also be used for inter-cell connection, because each bipolar current collector can conduct electricity from the anode of one cell to the cathode of the next cell. Because an entirety, or nearly an entirety, of an area of the bipolar plate can be made available for electrical conduction, current density uniformity can be significantly improved as compared to other configurations. Accordingly, the bipolar architecture is suitable for high power applications. The bipolar hybrid device is intrinsically a high voltage battery, because the cells can be arranged in series. The voltage of the device can be represented by.

$$V = N V_S, \qquad [\text{EQN. 5}]$$

where N can represent a number of cells and VS can represent a voltage developed by each of the cells. The capacity of the bipolar hybrid battery is equal to the capacity of the individual cell.

Figure 2:
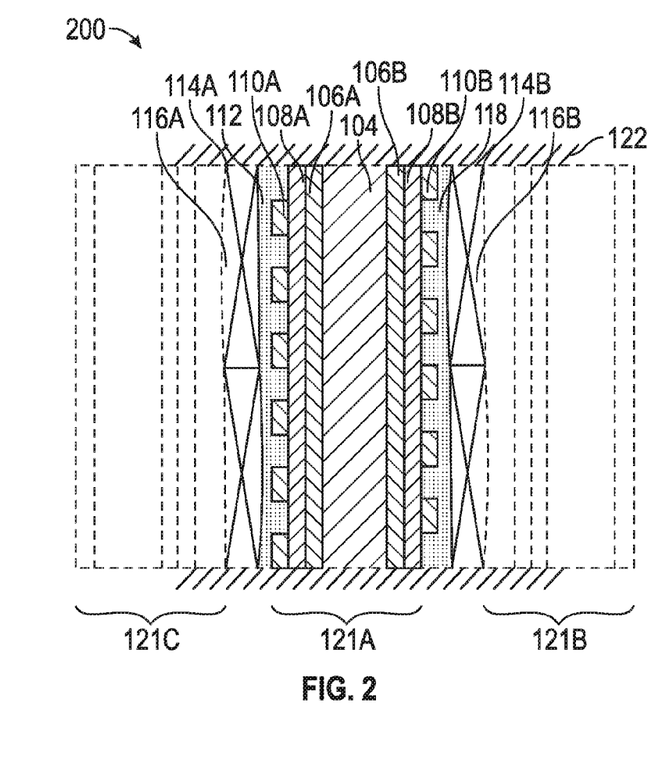
FIG. 2 illustrates generally a section view of an example including a bipolar battery plate, such as can be included as a portion of a "hybrid" bipolar battery assembly.

FIG. 2 illustrates generally a section view of an example including a bipolar battery plate, such as can be included as a portion of a "hybrid" bipolar battery assembly.

A first hybrid bipolar battery plate 121A can include a rigid semiconductor substrate, such as a conductive silicon wafer 104, as a current collector. The hybrid bipolar battery plate 121A can include one or more of an ohmic contact layer 106A and an adhesion layer 108A located at or near a first surface of the conductive silicon wafer 104. An active material 112 can include a first polarity. A second ohmic contact layer 106B can be included on a second surface of the conductive silicon wafer 104 opposite the first surface. The second ohmic contact layer 106B can include the same material as the first ohmic contact layer 106A or a different material, such as to provide an electrode for connection to other portions of a battery assembly, to provide a corrosion-resistant layer, or to provide a mirror image configuration having a stack-up similar to the first surface of the conductive silicon wafer 104. A second adhesion layer 108B can also be included.

In an illustrative example, one or more metal silicides can be formed on one or both sides of the silicon wafer 104 as at least a portion of one of the first or second ohmic contact layers 106A or 106B. In an illustratively example, a lead-tin alloy layer can be formed on one or more both sides of the silicon wafer 104 as at least a portion of one of the first or second adhesion layers 108A or 108B, such as deposited upon the first or second contact layers 106A or 106B.

Generally, a current collector is specified to include good mechanical properties, including providing good electronic conductivity, but also serving as an ionic insulator. For certain applications, the current collector is also generally specified for electrochemical compatibility with lead acid battery chemistry. The silicon wafer 104 can be used as a current collector. Silicon is abundant, and is generally commercially available in various shapes and forms. Elemental silicon is generally mechanically light and strong, impervious to sulfuric acid and can be doped to a resistivity of less than 1 mΩcm. To render a surface of silicon compatible with lead acid electrochemistry, one or more ohmic contact layers 106A or 106B can be formed on a surface of the silicon wafer 104, such as on opposite surfaces.

For example, the ohmic contact layers 106A or 106B can be formed on the silicon surface by first depositing a thin layer of metal at the surface followed by annealing to high temperatures under inert atmosphere. In one example, 50 to 60 nanometers (nm) of nickel can be deposited onto both sides of the silicon wafer by physical vapor deposition. The wafer can be annealed to 480° C. in an inert ambient environment, such as to form nickel silicide (NiSi) on the surface. In another example, 500 nm of nickel can be electroplated onto the silicon wafer, and the wafer can be annealed to 450° C. to form nickel silicide. In other examples, one or more metals such as cobalt, titanium, tantalum, tungsten, and molybdenum, can also be used to from such as silicides cobalt silicide ($CoSi_2$), titanium silicide ($TiSi_2$), tantalum silicide ($TaSi_2$), tungsten silicide ($WSi_2$), or molybdenum silicide ($MoSi_2$), respectively. In order to improve adhesion of the active materials to the surface of the current collector, one or more adhesion layers 108A or 108B can also be deposited onto the current collector.

In an example, a nickel silicide surface can be cleaned with a buffered oxide etch (BOE) solution, and lead (Pb) can be deposited onto nickel silicide by electroplating. In another example, nickel silicide surface can be cleaned with a ammonium bifluoride (ABF) solution, and a lead-tin alloy (PbSn) can be deposited onto nickel silicide by electroplating. The lead or lead-tin adhesion generally improves adhesion of active material pastes as a corrosion layer can be located between the active materials and the adhesion layer, which can improve a cycling life of the battery. In an example, the adhesion layer can have an arrayed pattern to provide additional support.

A capacitor electrode material 118 can be included, such as to provide an electrode having a polarity opposite the first active material 112A. A first electrolyte region 116A can separate the battery plate 121A from an adjacent battery plate 121C, and a second electrolyte region 116B can separate the battery plate 121A from another adjacent battery plate 121B. The electrolyte regions 116A or 116B can include a separator 114A or 114B (e.g., an absorbed glass mat or other mechanical separator), such as assist in maintaining a specified separation between the battery plates. The electrolyte regions 116A and 116B are generally fluidically isolated from each other so that conduction occurs serially through a bulk of the conductive silicon wafer 104.

To assist in supporting an active material 112 or a capacitor electrode material 118, one or more mechanical supports such as a first mechanical support 110A or a second mechanical support 110B can be included. Such supports can include a structure mechanically coupled or adhered to the current collector, or, in an example, the semiconductor substrate can be patterned or otherwise treated to provide a surface that includes mechanical support features such as to aid in retaining a paste material during or after fabrication of a hybrid energy storage device assembly.

Figure 3:
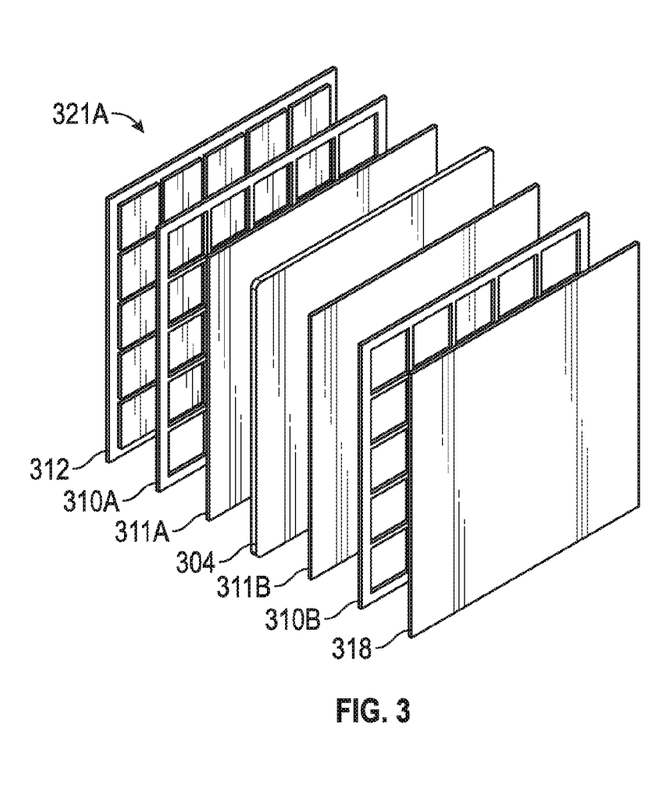
FIG. 3 illustrates generally an example of a bipolar battery plate that can include a silicon wafer current collector and a mechanical support grid, such as can be included as a portion of a "hybrid" bipolar battery assembly.

A hybrid cell as mentioned above can be referred to an "asymmetric cell." such as can be arranged in a bipolar configuration using a rigid semiconductor substrate as a current collector as shown illustratively in the example of FIGS. 1B, 2, and 3. From a material perspective, the present inventors have recognized, among other things, that a thin and light current collector can be used (e.g., a silicon wafer), such as to reduce one or more of a size or weight, and can alleviate a detrimental effect of anodic corrosion. In an example, a hybrid asymmetric cell can include a battery-type electrode and an electrochemical capacitor-type electrode. In the illustrative example of a hybrid lead acid battery, a positive electrode can be formed (e.g., using deposition) to provide a lead dioxide ($PbO_2$) active material, and a negative electrode can include a porous material, which can act as an electrochemical double layer super-capacitor. In the hybrid cell, the electrolyte can be sulfuric acid ($H_2SO_4$). Other active materials can be used, such as for the positive electrode. For example, the positive electrode can include or can be fabricated for use with a paste-form active material or other form of active material such as in combination with a deposited active material, or as an alternative to using a deposited active material. Similarly, the active material need not be limited to a thickness of a single deposited layer. Other active materials and layer thicknesses can be used, such as for a positive electrode in a hybrid configuration.

From an electrochemistry standpoint, the present inventors have also recognized, among other things, that the asymmetric hybrid device including lead acid battery chemistry can reduce or eliminate the effects of sulfation, because the negative active material of a generally-available lead acid battery can be replaced by a super-capacitor in the hybrid cell. The hybrid device can combine an energy density advantage of the battery electrode and a power density advantage of the super-capacitor electrode. For example, an electrochemical super-capacitor can offer impressive cycle life compared to a generally-available lead acid battery, because side reactions, which can limit such cycle life, can be reduced or eliminated.

FIG. 3 illustrates generally an example of a hybrid bipolar battery plate 321A that can include a silicon wafer current collector 304 and a mechanical support grid (e.g., a "scaffold"), such as can be included as a portion of a "hybrid" bipolar battery assembly. In an example, the battery-type and capacitor-type electrodes can be fabricated on opposite sides of the bipolar plate 321A. The plates can then be stacked and sandwiched with electrolyte in series configuration, such as to provide a bipolar hybrid lead acid battery assembly. Such a bipolar architecture can be simpler than generally-available lead acid battery technology because electrical connections generally used for parallel cell arrangement can be eliminated. Ohmic losses can be reduced in a bipolar battery configuration, such as because a whole plate area can be utilized to conduct current through the battery. Such attributes of the bipolar architecture can generally offer improvements in energy density, power density, as well as cycle life while still using a lead acid chemistry.

Silicon wafers are generally fabricated for use in semiconductor, solar, and other microelectronic or microelectromechanical (MEMS) applications. Silicon wafers, such as those with a density of about 2.65 grams per cubic centimeter, can be much lighter when used as a current collector than generally-available lead grid structures. Such silicon wafers can be generally resistant (and can be made even more resistant) to $H_2SO_4$ corrosion. Because of a high volume of use in other applications, silicon wafers are readily available at low cost. Although mono-crystalline silicon is generally a semiconductor, it can be made conductive by appropriate doping. In an example, a silicon wafer can be made conductive by such doping, such as to provide resistivity less than 0.001 $\Omega$-cm. For applications as current collectors in batteries, a resistivity need not be so low. For example, a wafer resistivity of 5 $\Omega$-cm or less can be used. In an example, a silicon wafer for current collector use can be, for example, heavily n-doped with phosphorous or arsenic to provide excess carriers and a resistivity of less than 5 $\Omega$-cm.

Silicon wafers are available in different sizes (e.g., up to 300 millimeters diameter or beyond), shapes (e.g., round or square), crystal orientation and structure (e.g., single- or multi-crystalline), and surface textures (e.g., textured such as provided after sawing from an ingot, or smooth after treatment such as lapping or etching). Silicon wafers generally used by the solar industry can be used for battery applications, as they are available in high quantities at low cost. Standard solar wafers can be around 125 millimeter or around 156 millimeters square, with thickness less than 750 micrometers, such as 200 micrometers. Such dimensions are compatible with the cross-sectional dimensions of generally-available lead acid batteries. Circular or other irregularly-shaped wafers can also be cut into other geometries, such as into rectangles with side lengths ranging from around 120 millimeters to around 200 millimeters to suit certain applications. Although thinner silicon wafers can enhance an energy density of the battery pack, a wafer thickness can be biased toward or otherwise selected for mechanical robustness, such as trading off such robustness with energy density. As-cut single-crystalline or multi-crystalline wafers can have rough surfaces. Roughness, such as along saw-roughened surfaces, can be cleaned and textured by various processes, such as can include chemical wet etch procedures. In an example, a metallurgical grade silicon wafer can be specified for use in a battery plate.

The hybrid bipolar battery plate 321A can include a first active material 312, such as a paste, corresponding to a first polarity. The paste 312 can be applied to a first mechanical support 310A, such as a mechanical support 310A fabricated or patterned using a variety of materials. One or more layers such as a first adhesion layer or first ohmic contact layer 311A can be formed on or as a portion of the conductive silicon wafer 304. On an opposite side of the conductive silicon wafer 304, one or more layers such as a second adhesion layer or a second ohmic contact layer 311B can be formed. A second mechanical support 310B can be used, such as to provide support for a capacitor-type electrode 318, such as corresponding to a second polarity opposite the polarity of the first active material 312. The capacitor-type electrode 318 can include carbon, such as a porous carbon material.

The mechanical supports 310A and 310B shown in FIG. 3 are illustrative. Other configurations can be used, such as a pattern or array of linear segments, or an array of mesa structures (e.g., such as corresponding to an "inverse" of the grid pattern of FIG. 3). The mechanical support can be fabricated using one or more of printing, deposition (e.g., electrodeposition), molding, stamping, or using one or more other techniques.

In an illustrative example, a bipolar hybrid energy storage device can use generally-available cathode materials which are generally compatible with lead acid battery chemistry. For example, a positive active material 312 can be adhered to the current collector 304 either directly or indirectly. In a direct pasting approach, the positive material can be pasted onto the surface of the current collector 304. The pasted current collector can then be cured at high temperature to reduce the water composition and to adjust the consistency of the active material 312. In an indirect approach, the active material 312 can be pasted and cured on a scaffold structure (e.g., support 310A). The scaffold structure can include a rectangular grid pattern, such as comprising an acid resistant plastic. In an example, the scaffold can be made from acrylonitrile butadiene styrene (ABS) plastic. In an example, the scaffold can be made from one or more of polypropylene (PP), polyvinyl chloride (PVC), or polytetrafluoroethylene (PTFE). In an example, the scaffold grid can be formed using a carbon-loaded or carbon-doped plastic material to improve electrical or thermal conductivity.

Figure 4:
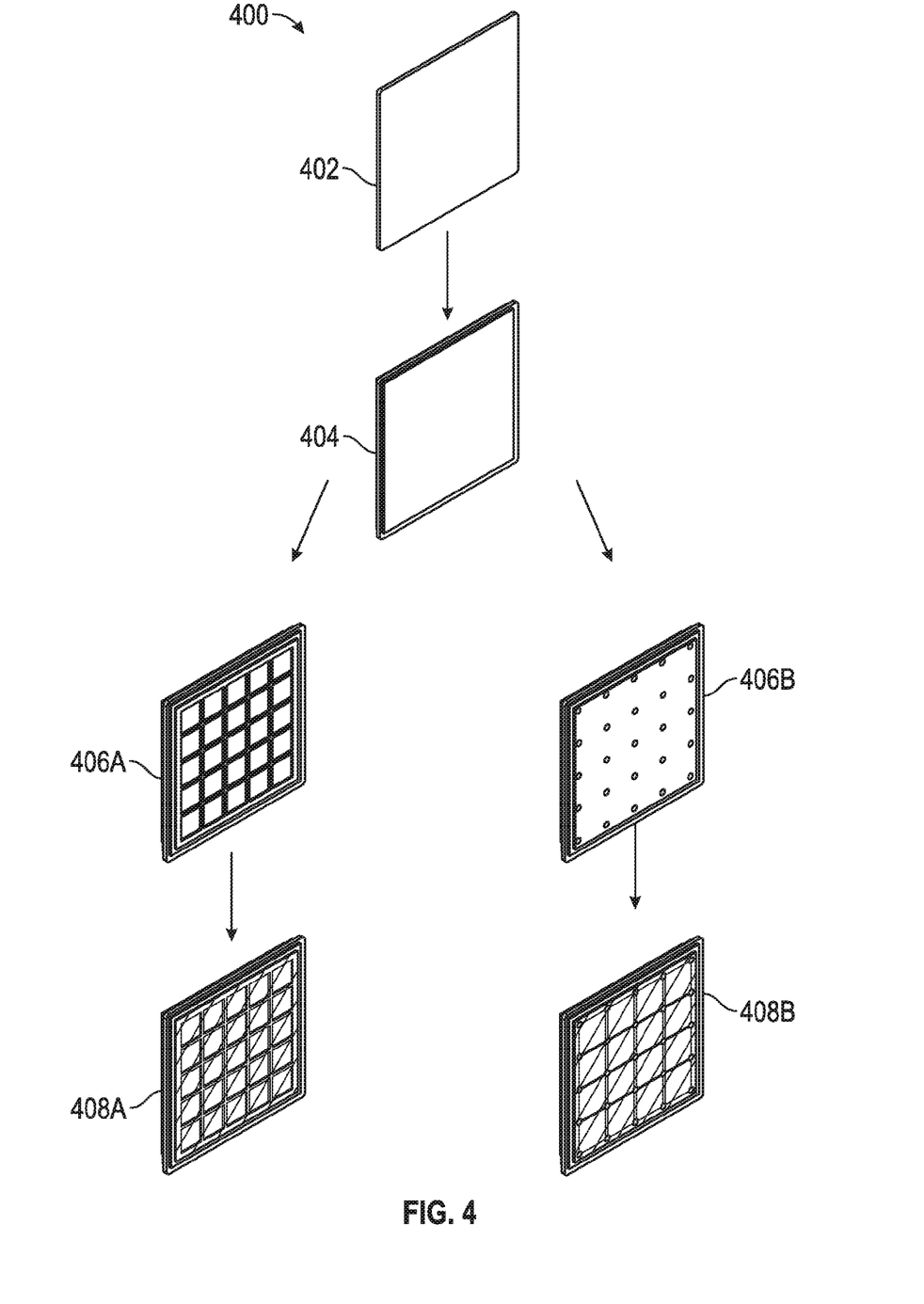
FIG. 4 illustrates generally a technique, such as method, that can include fabricating a bipolar battery plate including a silicon wafer current collector, according to an example.

FIG. 4 illustrates generally a technique 400, such as method, that can include fabricating a bipolar battery plate including a silicon wafer current collector, according to an example.

At 402, a silicon wafer current collector can be formed. For example, such a wafer can be sawed out of a single crystal boule, or otherwise formed such as from a slab of multi-crystalline silicon. The silicon wafer can be purchased in a first geometry (e.g., a circular wafer) then further cut to a desired geometry. The silicon wafer can be polished, etched, lapped, or otherwise processed to provide a desired surface finish. The silicon wafer can be doped to achieve a desired conductivity level, such as having a desired conductivity type (e.g., n-type doping).

At 404, an ohmic contact layer can be formed on at least one surface of the conductive silicon wafer. Such an ohmic contact layer can include a silicide. In an example, each face of the wafer can include an ohmic contact layer, and the ohmic contact layers on each face need not be the same material or thickness as each other. One or more other layers (e.g., adhesion or barrier layers) can be included on one or more faces of the silicon wafer, such as deposited or otherwise formed upon one or more ohmic contact layers.

At 406A or 406B an arrayed pattern can be formed (such as placed or deposited) on the conductive silicon wafer, such as upon the ohmic contact layer, to provide or enhance mechanical support of the active material pastes. In one approach, at 406A, a square or rectangular grid pattern (e.g., a scaffold structure) can be formed, such having a thickness of around 100 micrometers to around 500 micrometers, or including another thickness. For example, such a grid can include Pb deposited on the surface of the conductive silicon wafer, such as by electrodeposition. Such electrodeposition can include use of a mechanical (e.g., contact) mask. In another example, the grid can include an acid-resistant polymer material.

In another approach, such as at 406B, an array of bumps or mesas can be formed (e.g., placed or deposited) on the current collector, such as by electrodeposition. In some examples, an array of Sn, Pb—Sn, or In—Sn solder pastes can be applied onto the current collector, such as by pasting, heat pressing, extrusion dispense, or screen printing. The array pattern can adhere naturally onto a Pb adhesion surface (e.g., adhesion layer) of the assembly. While the wafer, grid, and bump pattern configurations shown in FIG. 4 are rectangular, other shapes and symmetries can be used. In an example, an unmasked deposition can be used, such as followed by an etching process, to provide a specified pattern at 406A or 406N. In an example, one or more mesas or bumps can be from about 100 micrometers to about 500 micrometers in thickness, or can include another thickness. In an example, one or more lines or bumps can include Sb, Bi, In, Pb, Sn, Ag, or combinations thereof (e.g., an alloy).

At 408A or 408B, paste formulations and processing procedures compatible with generally-available lead acid batteries can be used to apply active material paste directly onto the silicon wafer assembly. For example, conductive silicon wafers can be made compatible with such pasting equipment, such as with modifications to adapt such equipment to the size of such wafers. Because silicon has a high melting point and good thermal conductivity, curing temperatures used for generally-available pasting processes can be used to cure active material pastes as a portion of the current collector assembly including the conductive silicon wafer. With higher curing temperatures, a mechanical support including a Pb grid array pattern or a Sn solder bump array can be fused with the active material pastes on the current collector, which can result in strong adhesion and desirable mechanical support.

In an example, a first surface of the current collector can include an active material paste to provide a battery-type electrode, and a second surface opposite the first surface can include carbon, such as a porous carbon material, to provide a capacitor-type electrode.

Figure 5:
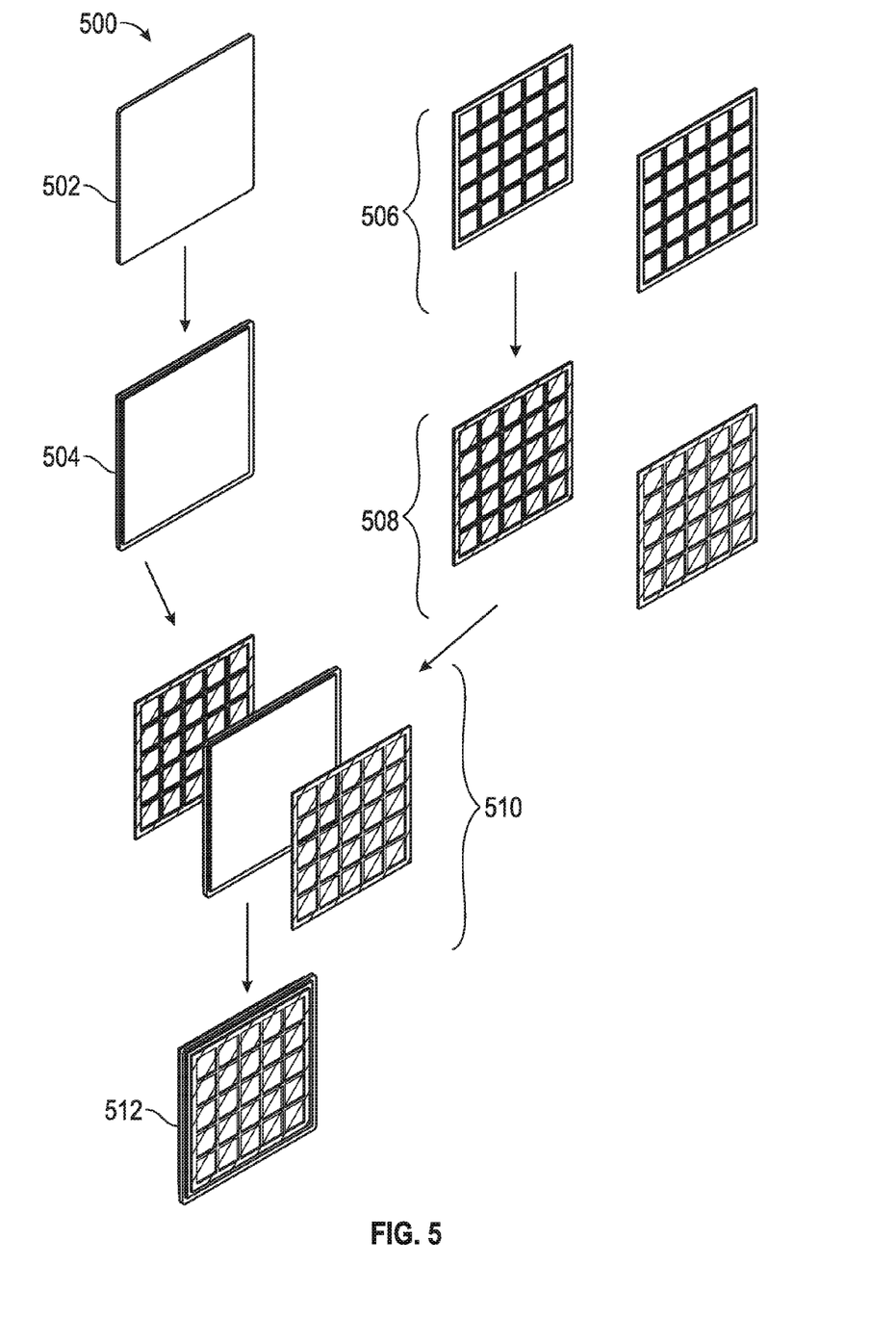
FIG. 5 illustrates generally a technique, such as method, that can include fabricating a bipolar battery plate including a silicon wafer current collector, according to an example.

FIG. 5 illustrates generally a technique 500, such as method, that can include fabricating a bipolar battery plate including a silicon wafer current collector, according to an example. In some cases, generally-available pasting equipment may not be suitable to directly apply an active material paste to a conductive silicon wafer current collector assembly. In cases where the silicon wafer current collector may be incompatible with the existing pasting equipment, active material pastes can be applied to "external" grids (e.g., scaffolds) before such grids are assembled with the conductive silicon wafer. For example, the external grid can be made of H2SO4 resistant plastic such as one or more of acrylonitrile butadiene styrene ("ABS"), low density polyethylene ("LDPE"), polypropylene ("PP"), polyvinylidene fluoride ("PVDF"), or polytetrafluoroethylene ("PTFE"). In an example, an external grid can be formed of carbon graphite, which can have an advantage of being electrically conductive. The pasted grids can be then sandwiched with the wafer collector, and cured to form a bipolar plate assembly (see, e.g., FIG. 2), such as a hybrid bipolar plate as described in other examples herein.

At 502, a conductive silicon wafer can be formed, such as using one or more techniques discussed above in relation to FIG. 4 or elsewhere herein. At 504, one or more layers such as an ohmic contact or adhesion layer can be deposited, such as described in other examples elsewhere herein. At 506, an "external" mechanical support can be formed, such as can include a grid structure or other shape. As mentioned in examples elsewhere herein, such a mechanical support can be conductive or non-conductive. At 508, a paste material can be applied, such as a first polarity active material paste to a first mechanical support, and a capacitor electrode material to a second mechanical support. At 510, the first and second pasted mechanical supports can be applied to the conductive silicon wafer. At 512, one or more of the pastes can be cured, such as thermally.

To assemble the bipolar lead acid battery using a bipolar plate assembly as described in the examples herein, the bipolar plates (including conductive silicon wafers) can be sandwiched with separators. As shown in FIGS. 1B, 2, 3, and elsewhere, gaps between the plates can be filed with an electrolyte (e.g., H2SO4). Edges of the bipolar plates can be sealed, so that each electrolyte compartment is electrically isolated. In an example, electrolyte can be integrated with a mechanical separator. For example, electrolyte can be mixed with silica dust to form an immobilized gel commonly known as gelled electrolyte. In an example, absorbed glass mats (AGM) can be used, such as including electrolyte-saturated boron silicate mats as separators.

As in other example described herein, a first surface of the current collector can include an active material paste to provide a battery-type electrode, and a second surface opposite the first surface can include carbon, such as a porous carbon material, to provide a capacitor-type electrode. A capacitor electrode can be used as the anode of the bipolar hybrid energy storage device. The capacitor electrode can include a porous carbon material. Different forms of carbon, such as one or more of a meso porous carbon, a nano porous carbon, a carbon foam, a fullerene, graphene, or nanotubes can be used. In an example, a porous carbon electrode can be adhered onto the current collector, such as directly. In an example, porous carbon particles can be mixed with a binder material such as polyvinylidene fluoride (PVDF) and then adhered onto the current collector. In an example, porous carbon particles are pasted onto a scaffold structure for mechanical support, and the pasted scaffold is adhered to the current collector similarly to the technique shown illustratively in FIG. 4.

Hybrid battery plate assemblies can be one or more of encased and edge-sealed with mechanical casings. The casings can be made of plastics such as acrylonitrile butadiene styrene (ABS) plastic. In an example, the casing can be made from one or more of polypropylene (PP), polyvinyl chloride (PVC), or polytetrafluoroethylene (PTFE). In an example, plastics infused with fullerene particles, nanotubes, or graphene can be used to improve the thermal conductivity of the mechanical casings. The current collectors are generally hermetically sealed to the mechanical casing such as using adhesives, or by contact without adhesives. In an example, the current collector can be edge-sealed directly onto a casing portion with an acid-resistant epoxy adhesive. In an example, a seal ring made of expanded PTFE can be epoxied onto the edge of the silicon current collector, and the sealed current collector can be adhered (e.g., epoxied) to the casing ring. In this example, the expanded PTFE seal ring acts can be configured as a shock absorber between the current collector and the casing. In an example, current collectors are edges sealed to the casing using compressible seal ring materials.

To assemble a bipolar hybrid device, an encased current collector, a lead dioxide cathode, an absorbed glass mat separator, and a capacitor anode can be stacked together. The stacking process can be repeated to assemble a multi-cell bipolar hybrid device (e.g., a "hybrid battery"). A number of cells in the stack can vary from one to twenty, or can include another number of cells, according to various illustrative examples. The stack can be terminated with end contacts and end caps to provide a bipolar hybrid energy storage device. The bipolar hybrid energy storage device can be filled with sulfuric acid electrolyte, and a formation procedure comprising of constant current and constant voltage charging steps can be used to condition the battery to enhance (e.g., maximize) discharge capacity. In an example, the formation procedure comprise repeated charge and discharge steps to condition the active materials inside the battery.

Figure 6:
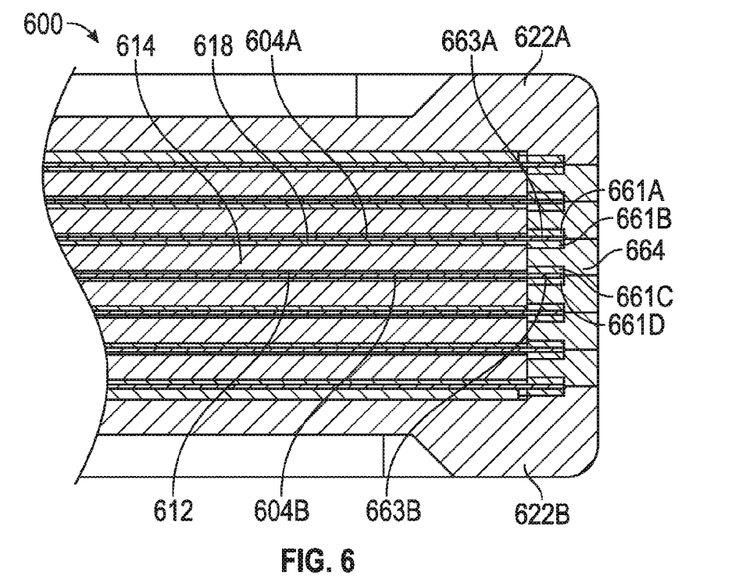
FIG. 6 illustrates generally an illustrative example that can include a section view of a bipolar hybrid battery assembly, such as can represent a six-cell stack.

FIG. 6 illustrates generally an illustrative example 600 that can include a section view of a bipolar hybrid battery assembly, such as can represent a six-cell stack. For purposes of illustration in FIG. 6, two current collectors 604A and 604B are shown including portions sealed using deformable (e.g., plastic) seals 661A, 661B. 661C, and 661D. In the example of FIG. 6, active material of the battery 612 can be located on one surface of each current collector, such as on the current collector 604B. In an example, such active material layers can be separated, such as using an inert separator 614. The separator 614 can provide further mechanical shock protection and can prevent shorting of one active material region to other portions of the battery, such as when the battery is placed in or transferred between different orientations. The current collectors 604A and 604B can be coupled to a casing ring 664. For example, the casing ring 664 can include ABS plastic. One or more adhesive seals (e.g., seals 663A or 663B) can be used to adhere the current collector 604 to other portions of the assembly, such as to adhere adjacent casing rings together. The top and bottom of the battery can be bounded by two end caps 622A and 622B which are similarly shaped to mate with plastic casing rings similar to the plastic casing ring 664. In this manner, a modular stacked configuration can be provided, such as including a hermetically-sealed housing comprising casing rings (e.g., ring 664) and end caps (e.g., caps 622A and 622B).

Figure 7:
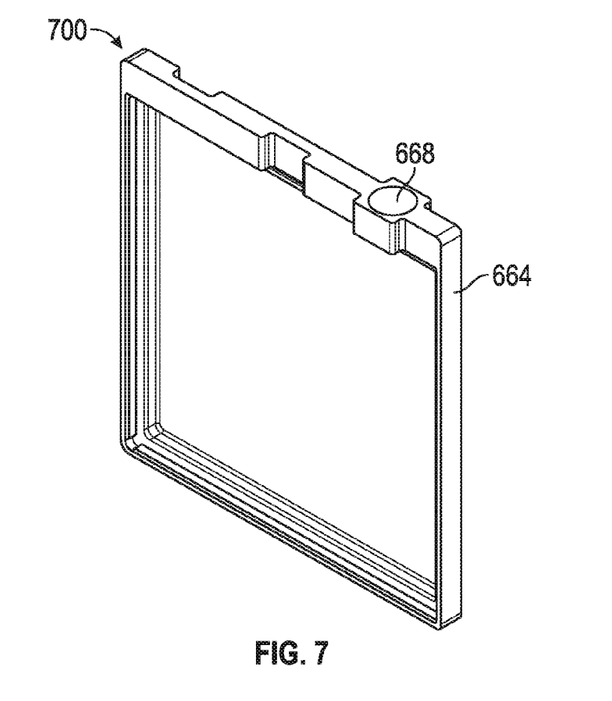
FIG. 7 illustrates generally an illustrative example that can include a casing ring, such as can be included as a portion of a bipolar hybrid battery assembly.

FIG. 7 illustrates generally an illustrative example 700 that can include a casing ring 664, such as can be included as a portion of a bipolar hybrid battery assembly. In the example shown illustratively in FIG. 7, the casing ring 664 can include a vent channel 668, such as to provide or, configured for installation of, a vent for batteries that include hydrogen or oxygen recombination. For completely sealed energy storage devices, the vent channel 668 can be capped or omitted.

Figure 8A:
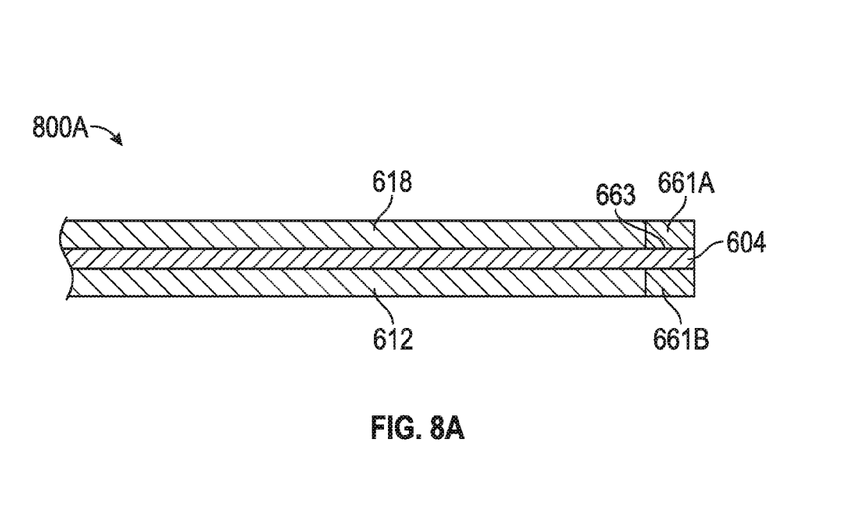
FIG. 8A illustrates generally an illustrative example that can include a section view of a current collector, such as can be coupled to deformable seals.

FIG. 8A illustrates generally an illustrative example 800A that can include a section view of a current collector 604, such as can be coupled to deformable seals 661A and 661B. In an illustrative example, the edge of the seals 661A and 661B can be flush with the current collector 604, but such seals could also be configured to extend beyond the edge. An adhesive 663 can be applied between the current collector 604 and the seals 661A, such as to prevent leakage. Such adhesive can be used, for example, if the current collector 604 surface is rough and the seal is not capable of providing adequate filling of the inconsistencies or otherwise conforming to the surface of the current collector 604. In such an example, the adhesive 663 can provide a primary seal while the seals 661A or 661B can provide shock protection and variable compressibility for the current collector 604 assembly. For example, the assembly shown in FIG. 8A can include at least a portion of a hybrid bipolar battery plate assembly, such as having an active material 612 located on a first surface of the current collector 604, and a capacitor electrode material 618 located on a surface opposite the first surface of the current collector 604.

Figure 8B:
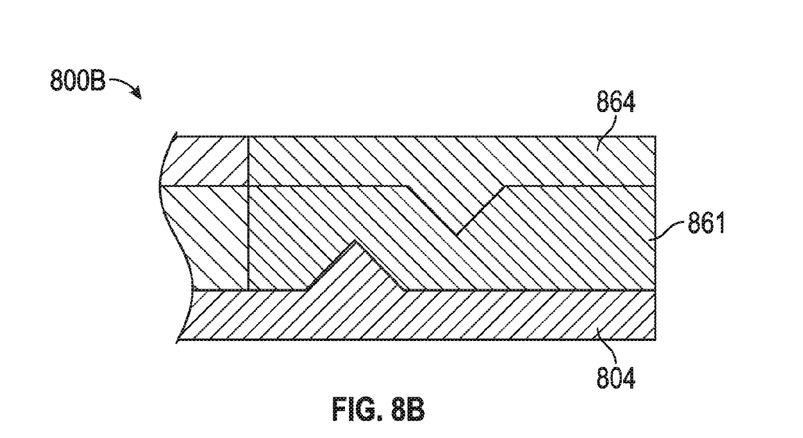
FIG. 8B illustrates generally an illustrative example that can include a section view of an interface where a knife-edged joint can be used to provide a hermetic seal.

FIG. 8B illustrates generally an illustrative example 800B, that can include a section view of an interface where a knife-edged joint can be used to provide a hermetic seal. A plastic casing portion 864 (e.g., a casing ring), can be shaped into a knife edge or otherwise include a knife-edge feature, such as configured to press into a deformable seal 861. A current collector 804 (e.g., a silicon wafer) can include a knife edge (or a knife edge feature can be coupled or adhered to the current collector), such as can be pressed into the deformable seal 861 from a side opposite the casing ring 864. When a specified compressive force is applied, the stress concentrations create a pressure area that liquid will not penetrate, or such a seal configuration can at least suppress or reduce a rate of such liquid penetration.

Various Notes & Examples

Example 1 can include or use subject matter (such as an apparatus, a method, a means for performing acts, or a device readable medium including instructions that, when performed by the device, can cause the device to perform acts), such as can include or use a hybrid energy storage device, comprising a first hybrid battery plate including, a first rigid semiconductor substrate configured as a current collector, a first active material paste located upon a first surface of the first rigid semiconductor substrate, a first porous carbon capacitor electrode located on a second surface of the first rigid semiconductor substrate opposite the first surface, a second hybrid battery plate, a first mechanical separator located between the first and second hybrid battery plates, and an electrolyte medium located between the first and second hybrid battery plates.

Example 2 can include, or can optionally be combined with the subject matter of Example 1, to optionally include a first rigid semiconductor substrate comprising a silicon wafer, the first active material paste comprising lead dioxide, and the first mechanical separator comprises an absorbed glass mat separator including an aqueous sulfuric acid electrolyte as the electrolyte medium.

Example 3 can include, or can optionally be combined with the subject matter of one or any combination of Examples 1 or 2 to optionally include a second hybrid battery plate comprising a second rigid semiconductor substrate configured as a current collector, a second active material paste located upon a first surface of the second rigid semiconductor substrate, and a second porous carbon capacitor electrode located on a second surface of the second rigid semiconductor substrate opposite the first surface. In Example 3, the first and second hybrid battery plates are arranged in a stacked configuration and enclosed in a housing.

Example 4 can include, or can optionally be combined with the subject matter of one or any combination of Examples 1 through 3 to optionally include a rigid semiconductor substrate comprising silicon, the silicon comprising at least one of a mono-crystalline, solar-grade multi-crystalline, or metallurgical-grade silicon.

Example 5 can include, or can optionally be combined with the subject matter of Example 4, to optionally include silicon heavily-doped with boron, phosphorus, or arsenic.

Example 6 can include, or can optionally be combined with the subject matter of one or any combination of Examples 1 through 5 to optionally include one or more thin film layers formed on at least one of the first or second surfaces of a silicon wafer comprising the rigid semiconductor substrate.

Example 7 can include, or can optionally be combined with the subject matter of one or any combination of Examples 1 through 6 to optionally include one or more thin film layers formed on the rigid semiconductor substrate, the one or more thin film layers comprising an ohmic contact layer including at least one of nickel silicide (NiSi), cobalt silicide (CoSi2), titanium silicide (TiSi2), tantalum silicide (TaSi2), tungsten silicide (WSi2), or molybdenum silicide (MoSi2).

Example 8 can include, or can optionally be combined with the subject matter of Example 7 to optionally include an adhesion layer formed upon the ohmic contact layer, the adhesion layer including lead or lead-tin alloy.

Example 9 can include, or can optionally be combined with the subject matter of one or any combination of Examples 1 through 8 to include, subject matter (such as an apparatus, a method, a means for performing acts, or a machine readable medium including instructions that, when performed by the machine, that can cause the machine to perform acts), such as can include a hybrid bipolar battery plate, comprising a rigid semiconductor substrate configured as a current collector, an active material paste located upon a first surface of the rigid semiconductor substrate, the active material paste configured for use as a battery-type cathode electrode, and a carbon capacitor electrode located on a second surface of the rigid semiconductor substrate opposite the first surface, the carbon capacitor electrode configured for use as a capacitor-type anode electrode.

Example 10 can include, or can optionally be combined with the subject matter of Example 9, to optionally include an active material paste comprising a lead dioxide paste.

Example 11 can include, or can optionally be combined with the subject matter of one or any combination of Examples 9 or 10 to optionally include a carbon capacitor electrode comprising at least one of porous carbon, carbon foam, a fullerene, a carbon nanotube, or graphene.

Example 12 can include, or can optionally be combined with the subject matter of one or any combination of Examples 9 through 11 to optionally include one or more of the active material paste or the carbon capacitor electrode comprising a paste applied to a scaffold structure for mechanical support, wherein the scaffold structure is coupled to or formed as a portion of the rigid semiconductor substrate.

Example 13 can include, or can optionally be combined with the subject matter of Example 12, to optionally include a scaffold structure comprising a rectangular arrayed scaffold structure including one or more of acrylonitrile butadiene styrene (ABS), polypropylene (PP), polyvinyl chloride (PVC), or polytetrafluoroethylene (PTFE).

Example 14 can include, or can optionally be combined with the subject matter of one or any combination of Examples 9 through 13 to optionally include one or more of the active material paste or the carbon capacitor electrode including a paste applied directly to the rigid semiconductor substrate.

Example 15 can include, or can optionally be combined with the subject matter of Example 14, to optionally include that at least one of the surfaces of the rigid semiconductor substrate is patterned.

Example 16 can include, or can optionally be combined with the subject matter of one or any combination of Examples 9 through 15 to optionally include a casing portion coupled to the rigid semiconductor substrate and configured to provide a seal for the bipolar battery plate around an edge or perimeter.

Example 17 can include, or can optionally be combined with the subject matter of Example 16, to optionally include a casing portion comprising at least one of acrylonitrile butadiene styrene (ABS), polypropylene (PP), polyvinyl chloride (PVC), or polytetrafluoroethylene (PTFE).

Example 18 can include, or can optionally be combined with the subject matter of one or any combination of Examples 16 or 17 to optionally include a casing portion including a plastic material infused with fullerenes, nanotubes, or graphene particles to improve thermal conductivity.

Example 19 can include, or can optionally be combined with the subject matter of one or any combination of Examples 16 through 18 to optionally include a the seal comprising an epoxy adhesive.

Example 20 can include, or can optionally be combined with the subject matter of one or any combination of Examples 16 through 19 to optionally include a seal comprising an insulating seal ring adhered to the rigid semiconductor substrate and the casing portion using an epoxy, the casing portion including a casing ring configured to be coupled to one or more other casing rings to provide a casing assembly.

Example 21 can include, or can optionally be combined with the subject matter of one or any combination of Examples 16 through 20 to optionally include a seal comprising a compressible seal ring.

Example 22 can include, or can optionally be combined with the subject matter of one or any combination of Examples 1 through 21 to include, subject matter (such as an apparatus, a method, a means for performing acts, or a machine readable medium including instructions that, when performed by the machine, that can cause the machine to perform acts), such as can include forming a first hybrid plate including forming a first active material layer located upon a first surface of the first rigid semiconductor substrate and forming a first carbon capacitor electrode located on a second surface of the first rigid semiconductor substrate opposite the first surface.

Example 23 can include, or can optionally be combined with the subject matter of Example 22, to optionally include coupling the first hybrid battery plate to a casing portion, the casing portion including a seal configured to seal a perimeter or edge of the first battery plate.

Example 24 can include, or can optionally be combined with the subject matter of one or any combination of Examples 22 or 23 to optionally include providing a first mechanical separator located at a first surface of the first hybrid battery plate, providing a second hybrid battery plate at the first mechanical separator at a location opposite the first hybrid battery plate, providing electrolyte medium located between the first and second battery plates.

Example 25 can include, or can optionally be combined with the subject matter of Example 22, to optionally include a separator comprising an absorbed glass mat, the providing the electrolyte medium including filling a region between the first and second battery plates with an aqueous electrolyte.

Example 26 can include, or can optionally be combined with any portion or combination of any portions of any one or more of Examples 1 through 25 to include, subject matter that can include means for performing any one or more of the functions of Examples 1 through 25, or a machine-readable medium including instructions that, when performed by a machine, cause the machine to perform any one or more of the functions of Examples 1 through 25.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A hybrid energy storage device, comprising:
a first hybrid battery plate including:
a first rigid semiconductor substrate configured as a current collector;
a first active material paste located upon a first surface of the first rigid semiconductor substrate, the first active material paste configured for use as a cathode electrode;
a first porous carbon capacitor electrode located on a second surface of the first rigid semiconductor substrate opposite the first surface, the first porous carbon capacitor electrode configured for use as an anode electrode;
a second hybrid battery plate;
a first mechanical separator located between the first and second hybrid battery plates; and
an electrolyte medium located between the first and second hybrid battery plates.

2. The hybrid energy storage device of claim 1, wherein the first rigid semiconductor substrate comprises a silicon wafer;
wherein the first active material paste comprises lead dioxide; and
wherein the first mechanical separator comprises an absorbed glass mat separator including an aqueous sulfuric acid electrolyte as the electrolyte medium.

3. The hybrid energy storage device of claim 1, wherein the second hybrid battery plate comprises:
a second rigid semiconductor substrate configured as a current collector;
a second active material paste located upon a first surface of the second rigid semiconductor substrate; and
a second porous carbon capacitor electrode located on a second surface of the second rigid semiconductor substrate opposite the first surface;
wherein the first and second hybrid battery plates are arranged in a stacked configuration and enclosed in a housing.

4. A hybrid bipolar battery plate, comprising:
a rigid semiconductor substrate configured as a current collector;
an active material paste located upon a first surface of the rigid semiconductor substrate, the active material paste configured for use as a cathode electrode; and
a carbon capacitor electrode located on a second surface of the rigid semiconductor substrate opposite the first surface, the carbon capacitor electrode configured for use as an anode electrode.

5. The hybrid bipolar battery plate of claim 4, wherein the rigid semiconductor substrate includes silicon, the silicon comprising at least one of a mono-crystalline, solar-grade multi-crystalline, or metallurgical-grade silicon.

6. The hybrid bipolar battery plate of claim 5, wherein the silicon is heavily-doped with boron, phosphorus, or arsenic.

7. The hybrid bipolar battery plate of claim 4, comprising one or more thin film layers formed on at least one of the first or second surfaces of a silicon wafer comprising the rigid semiconductor substrate.

8. The hybrid bipolar battery plate of claim 7, wherein the one or more thin film layers comprises an ohmic contact layer including at least one of nickel silicide (NiSi), cobalt silicide ($CoSi_2$), titanium silicide ($TiSi_2$), tantalum silicide ($TaSi_2$), tungsten silicide ($WSi_2$), or molybdenum silicide ($MoSi_2$).

9. The hybrid bipolar battery plate of claim 8, comprising an adhesion layer formed upon the ohmic contact layer, the adhesion layer including lead or lead-tin alloy.

10. The hybrid bipolar battery plate of claim 4, wherein the active material paste comprises a lead dioxide paste.

11. The hybrid bipolar battery plate of claim 4, wherein the carbon capacitor electrode comprises at least one of porous carbon, carbon foam, a fullerene, a carbon nanotube, or graphene.

12. The hybrid bipolar battery plate of claim 4, wherein one or more of the active material paste or the carbon capacitor electrode includes a paste applied to a scaffold structure for mechanical support, wherein the scaffold structure is coupled to or formed as a portion of the rigid semiconductor substrate.

13. The hybrid bipolar battery plate of claim 12, wherein the scaffold structure comprises a rectangular arrayed scaffold structure including one or more of acrylonitrile butadiene styrene (ABS), polypropylene (PP), polyvinyl chloride (PVC), or polytetrafluoroethylene (PTFE).

14. The hybrid bipolar battery plate of claim 4, wherein one or more of the active material paste or the carbon capacitor electrode includes a paste applied directly to the rigid semiconductor substrate.

15. The hybrid bipolar battery plate of claim 14, wherein at least one of the surfaces of the rigid semiconductor substrate is patterned.

16. The hybrid bipolar battery plate of claim 4, comprising a casing portion coupled to the rigid semiconductor substrate and configured to provide a seal for the bipolar battery plate around an edge or perimeter.

17. The hybrid bipolar battery plate of claim 16, wherein the casing portion comprises at least one of acrylonitrile butadiene styrene (ABS), polypropylene (PP), polyvinyl chloride (PVC), or polytetrafluoroethylene (PTFE).

18. The hybrid bipolar battery plate of claim 16, wherein the casing portion includes a plastic material infused with fullerenes, nanotubes, or graphene particles to improve thermal conductivity.

19. The hybrid bipolar battery plate of claim 16, wherein the seal includes an epoxy adhesive.

20. The hybrid bipolar battery plate of claim 16, wherein the seal includes an insulating seal ring adhered to the rigid semiconductor substrate and the casing portion using an epoxy; and     wherein the casing portion includes a casing ring configured to be coupled to one or more other casing rings to provide a casing assembly.

21. The hybrid bipolar battery plate of claim 16, wherein the seal includes a compressible seal ring.

22. The hybrid bipolar battery plate of claim 12, wherein the scaffold structure is coupled to the rigid semiconductor substrate.

23. The hybrid bipolar battery plate of claim 12, wherein the scaffold structure is formed as a portion of the semiconductor substrate.

\* \* \* \* \*